May 11, 1937.  A. M. BRADLEY ET AL  2,080,162
METHOD OF BAKING
Filed June 29, 1931
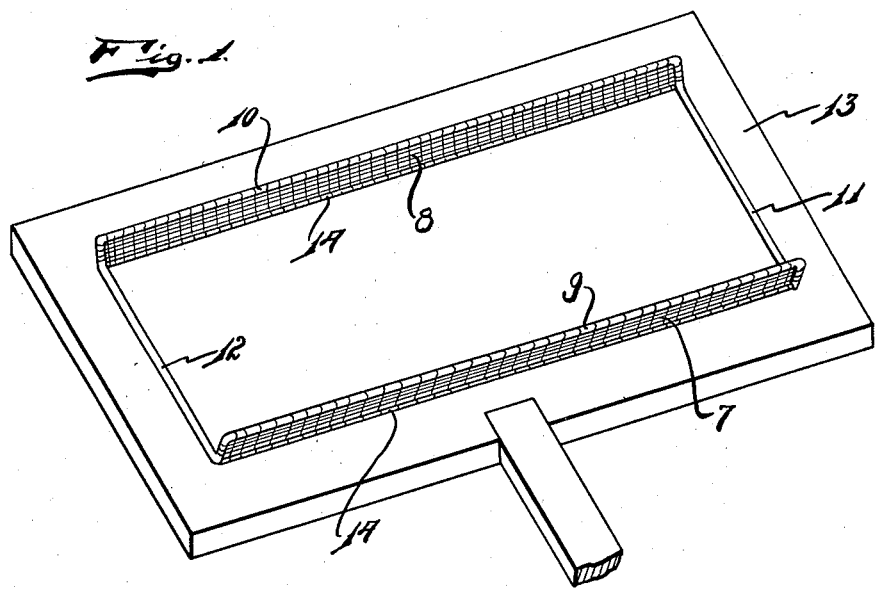
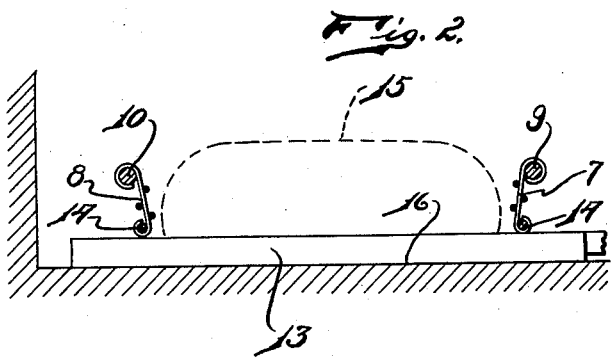
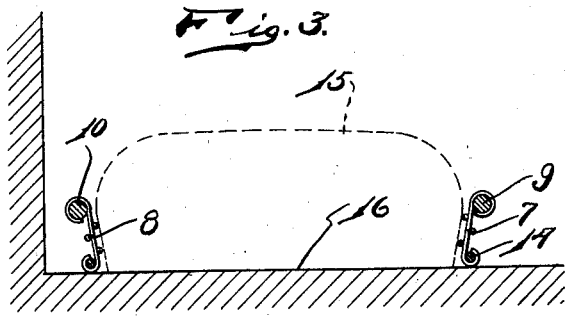
INVENTOR.
Ausborn M. Bradley &
George E. Watson
BY
Thos S Donnelly
ATTORNEY.

Patented May 11, 1937

2,080,162

UNITED STATES PATENT OFFICE 2,080,162

METHOD OF BAKING

Ausborn M. Bradley and George E. Watson, Detroit, Mich., assignors to Bakeries Service Corporation, New York, N. Y., a corporation of Delaware Application June 29, 1931, Serial No. 547,622

3 Claims. (Cl. 107—54)

Our invention relates to a new and useful improvement in a method of baking. The object of the invention is the production of loaves of hearth baked bread capable of being cut and wrapped by machinery or wrapped by machinery, and to this end, therefore, the invention also has for its object the production of hearth baked loaves of bread which will be of uniform length.

Another object of the invention is the method of baking hearth baked goods and preventing, during the baking operation, the creeping of the goods beyond a predetermined distance while at the same time in no manner interfering with the effect to be produced on the goods to be baked in the hearth baking method so that while the goods are maintained of uniform length, all of the advantages of hearth baking and the effect on the goods resulting from the same will be obtained.

Another object of the invention is the provision of a method of baking goods on the hearth and at the same time restraining creeping of the ends beyond predetermined distances.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of a peel with a restraining member positioned thereon.

Fig. 2 is a diagrammatic view, taken transversely through the restraining member of a pan of dough prior to the proofing operation.

Fig. 3 is a view similar to Fig. 2 after the baking operation.

It is well known that hearth baked goods are possessed of certain characteristics and attributes which are not present in pan baked goods. In the modern method of producing baked goods and particularly loaves of bread where the loaves of bread are sliced and wrapped or merely wrapped by machinery, it is necessary that the baked goods be of predetermined length. This is easily accomplished in pan baked goods but cannot be accomplished under known methods with hearth baked goods. Since the customary method of baking rye bread and other articles is of necessity by the hearth method of baking, these goods cannot be wrapped and sliced by machinery because of non-uniformity in length. The present invention overcomes such disadvantages and difficulties and affords a method of baking whereby such goods may be baked by the hearth method and still have their length definitely fixed. To this end, we provide a frame which is illustrated as comprising the screen side walls 7 and 8 which serve as the abutment or restraining members and between which are positioned a plurality of spaced apart lumps of dough. A wire frame has the side members 9 and 10 connected to the screens 7 and 8, and the end pieces 11 and 12 are downwardly offset so as to rest on the surface of the peel 13 when the goods are being placed in the oven. A wire reinforcement 14 is secured to the lower edge of each of the screens 7 and 8 and connected at their opposite ends to the downwardly offset end portions 11 and 12.

While we have illustrated screens 7 and 8, it is believed obvious that any foraminous or perforated restraining member may be satisfactorily used so long as it serves as an abutment for the ends of the loaves such as the loaf 15 and at the same time permits free access of the atmosphere or gases within the hearth to the goods to be baked. As shown in Fig. 2, the goods to be baked are generally, at their ends, spaced slightly from the restraining or abutment members 8 and 9. The goods, however, will lengthen during the proofing and baking operation, and these members 8 and 9 will serve as abutment members to definitely fix the length of the baked goods. As shown clearly in Fig. 3, the loaf 15 when placed in the oven rests upon the hearth 16.

It is obvious from this description that the goods are baked by the hearth baking process and that their length is definitely determined by restraining the creeping of the goods beyond a predetermined distance during the baking or proofing operation.

While we have illustrated and described the preferred form of construction of our invention, we do not wish to limit ourselves to the precise details of structure shown, but desire to avail ourselves of such variations and modifications as may come within the scope of the appended claims.

Having thus described our invention, what we claim as new and desire to secure by Letters Patent is:

1. The method of baking hearth bread which comprises proofing an elongated piece of dough on a freely portable supporting plate while confining the longitudinal expansion only of the dough to a predetermined length and while permitting free expansion of the piece of dough at its sides and top, transferring the loaf, while remaining so confined, to a hearth, and baking the loaf on the hearth while it is so confined whereby a loaf of hearth bread of predetermined length is formed.

2. The method of baking hearth bread which comprises placing an elongated lump of dough on the hearth of an oven, and baking the lump of dough on the hearth while limiting the longitudinal expansion only of the lump of dough and while permitting free expansion of the lump of dough at its sides and top and while bottom, sides and top of the lump of dough are directly exposed to the heat of the oven.

3. The method of baking hearth bread which comprises placing a plurality of elongated lumps of dough on the hearth of an oven, in abreast but spaced apart relation, and baking the lumps of dough on the hearth while simultaneously limiting the longitudinal expansion only of the lumps of dough and while permitting free expansion of the lumps of dough individually at their sides and tops and while the bottoms, sides and tops of the lumps of dough are individually directly exposed to the heat of the oven.

AUSBORN M. BRADLEY.
GEORGE E. WATSON.